US008744741B2

(12) United States Patent
Brimble et al.

(10) Patent No.: US 8,744,741 B2
(45) Date of Patent: Jun. 3, 2014

(54) LIDARS

(75) Inventors: Richard Arthur Brimble, Bristol (GB); Christopher David Claxton, Bristol (GB)

(73) Assignee: BAE Systems PLC, London (GB)

( * ) Notice: Subject to any disclaimer, the term of this patent is extended or adjusted under 35 U.S.C. 154(b) by 388 days.

(21) Appl. No.: 12/988,439

(22) PCT Filed: Apr. 17, 2009

(86) PCT No.: PCT/GB2009/050385
§ 371 (c)(1),
(2), (4) Date: Nov. 3, 2010

(87) PCT Pub. No.: WO2009/136184
PCT Pub. Date: Nov. 12, 2009

(65) Prior Publication Data
US 2011/0040482 A1 Feb. 17, 2011

(30) Foreign Application Priority Data
Apr. 18, 2008 (EP) .................................. 08154831
Apr. 18, 2008 (GB) .................................. 0807100.3

(51) Int. Cl.
*G06F 17/10* (2006.01)
*G06G 7/78* (2006.01)
*G08G 1/16* (2006.01)
*G01C 3/08* (2006.01)

(52) U.S. Cl.
CPC ... *G08G 1/16* (2013.01); *G01C 3/08* (2013.01)
USPC ........................................ 701/301; 356/5.01

(58) Field of Classification Search
CPC ..... G01S 7/4812; G01S 17/95; G01S 17/325; G01S 17/02; G01S 13/00; G01C 3/085; G01C 3/08; G01C 21/00; G01P 3/36; G01N 21/86; B60Q 1/00; B60R 21/00; G08G 1/16
USPC ........ 701/3, 301, 514, 45; 126/603; 356/4.01, 356/139.05, 5.01, 71, 5.09, 28.5; 340/903, 340/985, 435; 342/423, 70; 235/462.42; 353/20; 362/35; 33/1 M; 250/559.16
See application file for complete search history.

(56) References Cited

U.S. PATENT DOCUMENTS 3,184,847 A * 5/1965 Rosen ............................ 33/1 M
3,331,072 A * 7/1967 Pease ............................ 342/423

(Continued)

FOREIGN PATENT DOCUMENTS

DE 2 302 645 8/1974
DE 199 28 957 A1 11/2000

(Continued)

OTHER PUBLICATIONS

Notification Concerning Transmittal of copy of International Preliminary Report on Patentability (Forms PCT/IB/326 and PCT/IB/373) and the Written Opinion of the Searching Authority (Forms PCT/ISA237) issued in the corresponding International Application No. PCT/GB2009/050385 dated Oct. 28, 2010.

(Continued)

*Primary Examiner* — Tuan C. To
*Assistant Examiner* — Yuri Kan
(74) *Attorney, Agent, or Firm* — Buchanan Ingersoll Rooney PC (57) ABSTRACT

A Light Detection and Ranging (LIDAR) apparatus and method are disclosed having a rotatable light source enabled to emit a light ray, the light ray being emitted at a plurality of angular intervals; a reflection device, which can be parabolic in shape, and an analysis device for calculating a position at which one or more features are present based on the angle that the light ray was emitted and the time delay associated with the received reflected light, from a feature, wherein the analysis device takes into account the reflection of the light ray from the reflection device. In this manner, light rays may be reflected from heading in one direction to improve the resolution of the LIDAR in a second direction. Furthermore, where a parabolic reflector is used, positions of features can be calculated directly in a Cartesian coordinate system. Autonomous vehicles can use a LIDAR such as described herein to improve forward looking resolution in collision avoidance systems or terrain selection systems.

27 Claims, 3 Drawing Sheets

(56) References Cited

U.S. PATENT DOCUMENTS

| | | | |
|---|---|---|---|
| 4,121,890 A * | 10/1978 | Braun | 356/4.02 |
| 5,006,721 A * | 4/1991 | Cameron et al. | 250/559.16 |
| 5,164,784 A * | 11/1992 | Waggoner | 356/28.5 |
| 5,249,157 A | 9/1993 | Taylor | |
| 5,309,212 A * | 5/1994 | Clark | 356/5.09 |
| 5,757,501 A | 5/1998 | Hipp | |
| 5,898,482 A * | 4/1999 | Yamabuchi | 356/4.01 |
| 6,022,115 A | 2/2000 | Borra et al. | |
| 6,680,689 B1 * | 1/2004 | Zoratti | 342/70 |
| 7,154,649 B2 | 12/2006 | Pfefferseder et al. | |
| 7,315,503 B2 | 1/2008 | Cho et al. | |
| 7,428,041 B2 * | 9/2008 | Kallio | 356/4.01 |
| 7,819,538 B2 * | 10/2010 | Nobayashi et al. | 362/35 |
| 8,050,863 B2 * | 11/2011 | Trepagnier et al. | 701/514 |
| 2003/0220728 A1 * | 11/2003 | Rao et al. | 701/45 |
| 2004/0075544 A1 * | 4/2004 | Janssen | 340/435 |
| 2006/0055890 A1 * | 3/2006 | Kim et al. | 353/20 |
| 2007/0035718 A1 * | 2/2007 | Haddad | 356/71 |
| 2008/0040004 A1 * | 2/2008 | Breed | 701/45 |
| 2008/0156881 A1 * | 7/2008 | Vinogradov | 235/462.42 |
| 2010/0277713 A1 * | 11/2010 | Mimeault | 356/5.01 |
| 2011/0040482 A1 * | 2/2011 | Brimble et al. | 701/301 |
| 2011/0285982 A1 * | 11/2011 | Breed | 356/4.01 |

FOREIGN PATENT DOCUMENTS

| | | |
|---|---|---|
| DE | 199 28 958 A1 | 11/2000 |
| DE | 199 49 969 A1 | 4/2001 |
| DE | 10 2006 040 812 A1 | 5/2007 |
| EP | 0 473 866 A2 | 3/1992 |
| EP | 1 286 178 A2 | 2/2003 |
| JP | 1-161107 A | 6/1989 |

OTHER PUBLICATIONS

International Search Report (PCT/ISA/210) issued on Mar. 19, 2010, by European Patent Office as the International Searching Authority for International Application No. PCT/GB2009/050385.

Written Opinion (PCT/ISA/237) issued on Mar. 19, 2010, by European Patent Office as the International Searching Authority for International Application No. PCT/GB2009/050385.

European Search Report issued on Jul. 17, 2008, for European Patent Application No. 08154831.5.

United Kingdom Search Report for GB 0807100.3, dated Jul. 28, 2008.

Mo Longbin et al., "Unbiased Converted Measurements for Tracking," IEEE Transactions on Aerospace and Electronic Systems, Jul. 1998, pp. 1023-1027, vol. 34, No. 3, Piscataway, NJ, USA.

* cited by examiner

Fig. 5

LIDARS

The present invention relates to a LIDAR (Light Detection and Ranging) with increased resolution in at least one direction and particularly, but not exclusively, a Cartesian coordinate LADAR (Laser Detection and Ranging) for autonomous vehicles.

LIDAR devices, of which LADAR devices are a subset, are an optical remote sensing technology. In the case of LADARs, laser pulses are used to detect the range to an object by measuring the time delay between transmission of a pulse and detection of the reflected signal. LADAR devices have been used in many applications, including autonomous vehicles.

Most LADAR devices operate by rotating a laser, or a mirror deflecting a laser beam, through a predetermined angular rotation. As the angle that a pulse of the laser beam is transmitted is known, the LADAR device can output an angle and distance to any object detected, giving the position of the object in the spherical coordinate space. Typically, the position is then transformed to the Cartesian coordinate space for use with other systems.

One consequence of using this method is that the resolution of detection of any objects decreases the further the objects are away from the transmission point. That is, each pulse transmitted at a particular angular point diverges from a pulse transmitted from an earlier angular point.

In autonomous vehicle applications, LADARs are used for the detection of objects that may present a collision danger or navigation problem. LADARs with a decreasing resolution with increasing distance results in limitations on speed of travel for autonomous vehicles. If a vehicle requires to travel at faster speeds, any navigation system must make decisions on possible routes at an earlier stage and, therefore, requires information on obstacles at an earlier time.

Prior art methods for improving the resolution typically include increasing the number of lasers rotating in the device, but this still means that the resolution of the system varies according to the distance from the device.

According to a first aspect of the present invention there is provided a Light Detection and Ranging (LIDAR) apparatus comprising:
  a light source means enabled to emit a light ray and arranged such that the light ray is at least partially rotatable about a rotational centre, the light ray being emitted at a plurality of angular intervals;
  reflection means having a focal point, the reflection means positioned such that the rotational centre of the light ray is substantially located at the focal point and between a first angle and a second angle,
  reception means for receiving reflected light from one or more features in the path of the light ray; and
  analysis means for calculating a position at which one or more features are present based on the angle that the light ray was emitted and the time delay associated with the received reflected light, wherein, when the light ray is emitted between the first and second angles, the analysis means takes into account the reflection of the light ray from the reflection means.

A feature may be any surface which produces a reflection, such as from an object or surface in front of the LIDAR.

Preferably, the reflection means is a single mirror.

Alternatively, the reflection means is an array of mirrors.

Preferably, the reflection means characteristics and position are such that the successive emitted light rays once reflected from the reflection means follow a non-diverging path.

Preferably, the reflection means is parabolic in shape, enabling the successive emitted light rays, once reflected from the reflection means, to follow a substantially parallel path Preferably, the position of the or each feature is calculated using a Cartesian coordinate system having a reference point at the focal point.

Preferably, the analysis means calculates an intercept point, being the point at which the light ray is reflected from the reflection means.

Preferably, the light source means is rotatable through 360°.

Preferably, the light source means is rotatable between a first and second position in an arc.

Alternatively, the light source means is fixed with respect to the reflection means and the light ray is rotated between a first and second position in an arc through reflection from a rotatable light source mirror.

Preferably, the light source means and reception means are co-located at the focal point.

Alternatively, the light source means is located at the focal point and the reception means is spaced apart from the focal point.

Preferably, the light source is at least one laser and the light ray is a laser beam.

Preferably, the light source is a single laser and the light ray is a laser beam.

Preferably, the apparatus further comprises a refractive means enabled to refract light rays to reduce divergence from the light source means.

Preferably, the apparatus further comprises directional movement means arranged to pan or tilt the apparatus and allowing light rays reflected from the reflection means to be aimed in a particular direction.

According to a second aspect of the present invention there is provided a method of operating a LIDAR having a light source means comprising the steps of:
  (i) emitting a light ray from the light source means at regular intervals;
  (ii) rotating the light ray about a rotational centre at a plurality of angular intervals;
  (iii) reflecting the light ray from reflection means having a focal point, the reflection means positioned such that the rotational centre of the light ray is substantially located at the focal point and between a first angle and a second angle;
  (iv) receiving reflected light from one or more features in the path of the light ray;
  (v) calculating a position at which one or more features are present based on the angle that the light ray was emitted and the time delay associated with the received reflected light, wherein, when the light ray is emitted between the first and second angles, the analysis means takes into account the reflection of the light ray from the reflection means.

Preferably, the reflection means is a single mirror.

Alternatively, the reflection means is an array of mirrors.

Preferably, the reflection means characteristics and position are such that the successive emitted light rays once reflected from the reflection means follow a non-diverging path.

Preferably, the reflection means is parabolic in shape, enabling the successive emitted light rays, once reflected from the reflection means, follow a substantially parallel path Preferably, step (v) calculates the position using a Cartesian coordinate system having a reference point at the focal point.

Preferably, step (v) calculates an intercept point, being the point at which the light ray is reflected from the reflection means.

Preferably, step (ii) rotates the light source means through 360°.

Alternatively, step (ii) rotates the light source means between a first and second position in an arc.

Alternatively, the light source means is fixed with respect to the reflection means and step (ii) rotates the light ray between a first and second position in an arc through reflection from a rotatable light source mirror.

Preferably, the light source means and reception means are co-located at the focal point.

Alternatively, the light source means is located at the focal point and the reception means is spaced apart from the focal point.

Preferably, the light source is at least one laser and the light ray is a laser beam.

Preferably, the light source is a single laser and the light ray is a laser beam.

According to a third aspect of the present invention there is provided a collision avoidance system comprising a LIDAR according to the first aspect of the present invention.

According to a fourth aspect of the present invention there is provided a preferred terrain selection system comprising a LIDAR according to the first aspect of the present invention.

According to a fifth aspect of the present invention there is provided an autonomous vehicle comprising a vehicle collision avoidance system according to the third aspect or a preferred terrain selection system according to the fourth aspect of the present invention.

According to a sixth aspect of the present invention there is provided a driver assistance system for a vehicle comprising a vehicle collision avoidance system according to the third aspect or a preferred terrain selection system according to the fourth aspect of the present invention.

Embodiments of the present invention will now be described, by way of example only, with reference to the drawings, in which.

The following description refers exclusively to LADARs (Laser Detection and Ranging) as an example. LADARs are a particular implementation of a LIDAR (Light Detection and Ranging) and, as such, it should be appreciated that the invention is not limited to LADARs.

Prior art LADARs operate by sending out pulses of laser light in a number of directions and measuring the time delay of any reflections received back. The laser light is typically sent out in multiple directions by rotation of either a laser unit or by rotations of a reflecting device at which a laser unit is pointed. For 360° operation of a LADAR, it is usually the laser unit which is rotated to avoid directions in which the laser light cannot be sent.

These systems operate in the polar coordinate space (or spherical coordinate space for three dimensional systems) as, natively, the angle that the laser light is known and the distance to any object which reflects the light is calculated. That is, the angular coordinate θ of a polar coordinate space is known and the radial coordinate r is calculated. As mentioned previously, a drawback of LADARs operating in a rotational mode is that as the distance increases from the LADAR, the resolution decreases due to the diverging pulses of laser light as the angle changes.

In some applications, such as in autonomous vehicles, it is desirable to have a higher resolution at larger distance from the LADAR. For example, to enable higher speed operation of autonomous vehicles, higher resolution of features at a greater distance from the vehicle is necessary to enable the appropriate corrective action. Also, especially in autonomous vehicle applications, it is less important to detect features which are behind the LADAR.

Features are usually objects which are present in the range of the LADAR and which reflect light but can also be, for example, differing surfaces of ground. For ease of explanation, the remaining description will refer to objects which are detected.

Figure 1:
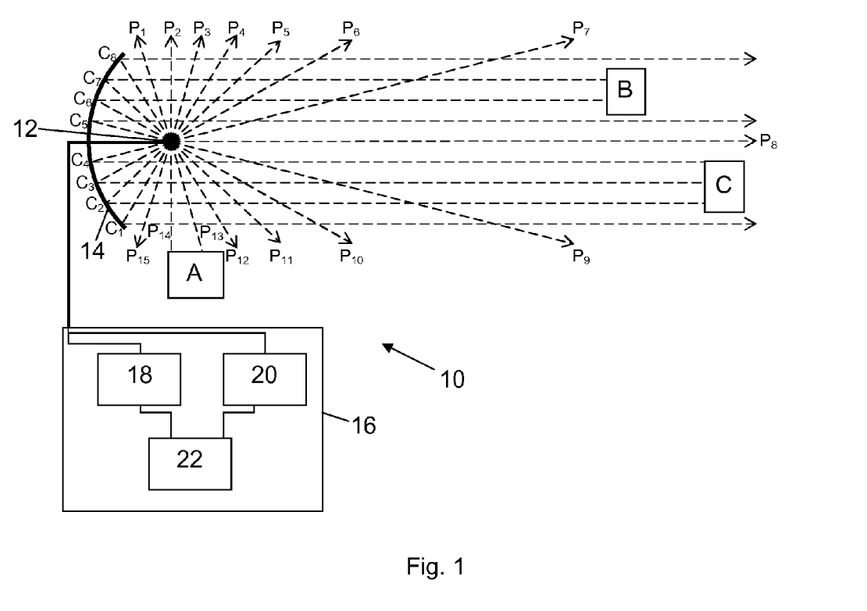
FIG. 1 shows a LADAR having a parabolic mirror.

Referring now to FIG. 1, a LADAR 10 is shown having a laser transmission and reception means 12, a parabolic mirror 14 and an analysis and control means 16. In this example, the laser transmission and reception means 12 rotates a single laser unit and emits laser beam pulses every 15°. The parabolic mirror 14 is positioned between angles 120° and 240°, taking laser beam path $P_8$ as 0°. Accordingly, laser beam paths $P_1$ to $P_{15}$ are positioned such that the laser pulses following those paths do not interact with the mirror 14. Laser beam paths $C_1$ to $C_8$ interact with the mirror 14 and are reflected, due to the parabolic nature of the mirror 14, parallel with laser beam path $P_8$.

When a laser beam emitted by the laser unit strikes an object in its path, the object reflects a proportion of the laser beam back towards the LADAR 10. For example, laser beams emitted along paths $P_{13}$ and $P_{14}$ will strike object A and laser light will be reflected back to the LADAR 10. The laser transmission and reception means 12 comprises a light reception means, such as an electronic image sensor, capable of detecting the reflected laser light.

The analysis and control means 16 comprises a pulse controller 18, a time-delay analysis means 20 and a position analysis means 22. The pulse controller 18 controls the laser unit to emit pulses of laser beams at pre-defined angular rotations or at regular time intervals where the angle of the beam emission being recorded. The time-delay analysis means 20 calculates the time-delay between the emission of the laser beams and the receipt of reflected light at the light reception means. As the speed of light is known, the position analysis means 22 can calculate a position of an object reflecting light from the angle at which the laser beam was emitted. The analysis and control means 16 includes a processor configured to execute instructions tangibly recorded on a non-transitory computer-readable recording medium (e.g., a non-volatile memory) for carrying out the operative functions of the analysis and control means 16 as described herein.

The position analysis means 22 is pre-configured with the position of the parabolic mirror 14. Where the laser unit is at an angle such that the laser beam will not be reflected by the parabolic mirror, such as beam paths $P_1$ to $P_{15}$, the position analysis means can calculate a polar coordinate position for any object which reflects light from the laser beam. The angle the beam is emitted gives the angular coordinate θ and the distance to the object gives the radial coordinate r. The polar coordinate position can then be transferred to Cartesian coordinates if required. As mentioned previously, this is the standard operation of a LADAR unit and results in a system in which the resolution decreases as increasing distances from the LADAR.

Where the laser unit is at an angle such that the laser beam will be reflected by the parabolic mirror, such as beam paths $C_1$ to $C_8$, the position analysis means 22 can directly calculate a Cartesian coordinate of any object which reflect lights from the laser beams. To perform this calculation the position analysis means 22 requires the perpendicular distance above a reference that the emitted laser beam is reflected by the parabolic mirror, giving a y-coordinate, and the perpendicular distance to the reflected object from a second reference, at right angles to the first, taking into account the variance in distance caused by the curvature of the parabolic mirror, giving an x-coordinate.

To expand on the calculation required by the position analysis means 22, the equation of a parabola is:

$$y^2 = 2px \qquad (1)$$

for an x-y coordinate system, where p is the distance from the vertex to the focus of the parabola. This can be written in parametric form as:

$$x = pt_1^2$$

$$y = 2pt_1 \qquad (2)$$

where $t_1$ is the parametric variable.

A LADAR beam modelled as a straight line emitted from the centre of the reference point $(x_0, y_0)$ can be written parametrically as:

$$x = x_0 + t_2 u$$

$$y = y_0 + t_2 v \qquad (3)$$

where $t_2$ is the parametric variable and $(u, v)$ is the direction vector of the LADAR beam. The angle of the beam with respect to the x-axis is given by $$\arctan\left(\frac{v}{u}\right).$$

The LADAR beam intersects with the mirror at:

$$pt_1^2 = x_0 + t_2 u \qquad (4)$$

and $$2pt_1 = y_0 + t_2 v \qquad (5)$$

Rearranging (4) gives $$t_2 = \frac{pt_1^2 - x_0}{u} \qquad (6)$$

and substituting (6) into (5) gives $$2pt_1 = y_0 + v\left(\frac{pt_1^2 - x_0}{u}\right) \qquad (7)$$

$$\Rightarrow 2put_1 = y_0 u + vpt_1^2 - vx_0 \qquad (8)$$

$$\Rightarrow (vp)t_1^2 - (2pu)t_1 + (y_0 u - vx_0) = 0 \qquad (9)$$

Thus, equation (9) is a quadratic equation in the parameter $t_1$ and so $$t_1 = \frac{2pu \pm \sqrt{(2pu)^2 - 4(vp)(y_0 u - x_0 v)}}{2vp} \qquad (10)$$

There are potentially two values of $t_1$ and this is the maximum number of times that the line can intersect the parabola. The relevant $t_1$ is that where the associated $t_2$ is greater than 0, as this is for the beam moving forwards in the same directions as the direction vector. The value of $t_2$ can be found from equation (6).

Having found $t_1$, the coordinates of the intercept can be found by substituting $t_1$ into equation (2).

$$\hat{x} = p\left(\frac{2pu \pm \sqrt{(2pu)^2 - 4(vp)(y_0 u - x_0 v)}}{2vp}\right)^2 \qquad (11)$$

$$\hat{y} = 2p\left(\frac{2pu \pm \sqrt{(2pu)^2 - 4(vp)(y_0 u - x_0 v)}}{2vp}\right)^2$$

The gradient of the tangent at the intercept can be found using $$X(t_1) = pt_1^2 \Rightarrow \frac{dX}{dt_1} = 2pt_1 \qquad (12)$$

$$Y(t_1) = 2pt_1 \Rightarrow \frac{dY}{dt_1} = 2p$$

and $$\frac{dy}{dx} = \frac{dt_1}{dX}\frac{dY}{dt_1} \qquad (13)$$

and thus $$\frac{dy}{dx} = \frac{1}{2pt_1}2p = \frac{1}{t_1} \qquad (14)$$

The equation of a line where a point $(\hat{x}, \hat{y})$ and a gradient m is specified is given by:

$$y - \hat{y} = m(x - \hat{x}) \qquad (15)$$

and so $$y = mx + (\hat{y} - m\hat{x}) \qquad (16)$$

For the parabola, the equation of the tangent to the parabola at the intercept is given by $$y_{tangent} = mx + (\hat{y} - m\hat{x}) \qquad (17)$$

and as $$m = \frac{dy}{dx}\bigg|_{(\hat{x}, \hat{y})} = \frac{1}{t_1}$$

then $$y_{tangent} = \frac{x}{t_1} + \left(\hat{y} - \frac{\hat{x}}{t_1}\right) \quad (18)$$

where $t_1$ is given by equation (10). Having calculated the intersect location, the next step is to calculate the trajectory of the reflected beam.

Figure 2:
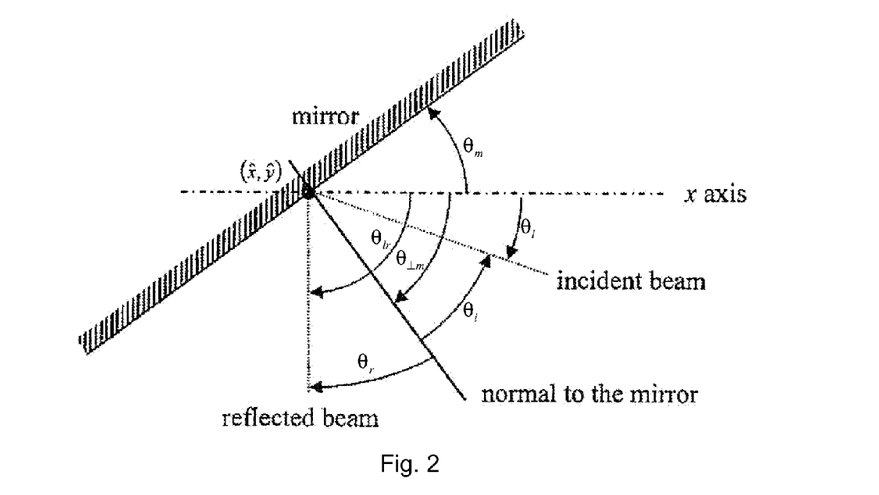
FIG. 2 shows an intercept point of a LADAR beam and corresponding reflected beam on a mirror.

The second law of reflection states that the angle of incidence of a light ray is equal to the angle of reflection. Referring to FIG. 2, the angle of an incident laser beam to the x-axis is given by $$\theta_i = \arctan\left(\frac{v}{u}\right) \quad (19)$$

(u, v) being the direction vector of the LADAR beam, as mentioned above, and the angle of the tangent to the mirror to the x-axis is given by $$\theta_m = \arctan\left(\frac{dx}{dy}\bigg|_{(\hat{x},\hat{y})}\right) \quad (20)$$

which is the arctangent of the gradient intercept, $(\hat{x}, \hat{y})$. From FIG. 2, it can be seen that the angle of the normal to the mirror at the intercept point is given by $$\theta_{\perp m} = \theta_m - \frac{\pi}{2} \quad (21)$$

The angle of incidence $\theta_i$ of the LADAR beam is given by $$\theta_i = \theta_l - \theta_{\perp m} \quad (22)$$

and using equations (20), (21) and (22) gives $$\theta_i = \arctan\left(\frac{v}{u}\right) - \arctan\left(\frac{dx}{dy}\bigg|_{(\hat{x},\hat{y})}\right) + \frac{\pi}{2} \quad (23)$$

The angle of reflection is such that $\theta_r = -\theta_i$ so $$\theta_r = -\left(\arctan\left(\frac{v}{u}\right) - \arctan\left(\frac{dx}{dy}\bigg|_{(\hat{x},\hat{y})}\right) + \frac{\pi}{2}\right) \quad (24)$$

The angle of the reflected beam relative to the x-axis is given by $$\theta_{lr} = \theta_{\perp m} - \theta_r \quad (25)$$

which of course is equivalent to $$\theta_{lr} = \theta_{\perp m} - \theta_i \quad (26)$$

and from equations (20), (21), (23) and (26)

$$\theta_{lr} = \left(\arctan\left(\frac{dx}{dy}\bigg|_{(\hat{x},\hat{y})}\right) - \frac{\pi}{2}\right) - \left(\arctan\left(\frac{v}{u}\right) - \arctan\left(\frac{dx}{dy}\bigg|_{(\hat{x},\hat{y})}\right) + \frac{\pi}{2}\right) \quad (27)$$

Rearranging equation (27) gives $$\theta_{lr} = 2\arctan\left(\frac{dx}{dy}\bigg|_{(\hat{x},\hat{y})}\right) - \arctan\left(\frac{v}{u}\right) - \pi \quad (28)$$

Substituting equation (14) into (28) gives $$\theta_{lr} = 2\arctan\left(\frac{1}{t_1}\right) - \arctan\left(\frac{v}{u}\right) - \pi \quad (29)$$

To obtain reflected LADAR beams parallel to the x-axis, the angle of the reflected LADAR beam relative to the x-axis is zero for all $\theta_m$ where $$\pi < \theta_l < \frac{3\pi}{2},$$

that is, $\theta_{lr}$ is equal to zero. Hence, rearranging equation (29)

$$\tan\left(\arctan\left(\frac{v}{u}\right) + \pi\right) = \tan\left(2\arctan\left(\frac{1}{t_1}\right)\right) \quad (30)$$

it is known that $$\tan(x+y) = \frac{\tan x + \tan y}{1 - \tan x \tan y} \quad (31)$$

and $$\tan(2x) = \frac{2\tan x}{1 - \tan^2 x} \quad (32)$$

so equation (30) can be expressed as $$\frac{\tan\left(\arctan\left(\frac{v}{u}\right)\right) + \tan\pi}{1 - \tan\left(\arctan\left(\frac{v}{u}\right)\right) + \tan\pi} = \frac{2\tan\left(\arctan\left(\frac{1}{t_1}\right)\right)}{1 - \tan^2\left(\arctan\left(\frac{1}{t_1}\right)\right)} \quad (33)$$

As $\tan\pi = 0$ then $$\tan\left(\arctan\left(\frac{v}{u}\right)\right) = \frac{2\tan\left(\arctan\left(\frac{1}{t_1}\right)\right)}{1 - \tan^2\left(\arctan\left(\frac{1}{t_1}\right)\right)} \quad (34)$$

which can be simplified to give $$\frac{v}{u} = \frac{2\left(\frac{1}{t_1}\right)}{1 - \left(\frac{1}{t_1}\right)^2} \quad (35)$$

or $$\frac{t_1^2 - 1}{t_1} = \frac{2u}{v} \quad (36)$$

substituting $t_1$ from equation (10) into equation (36) and setting $y_0 = 0$ and solving for $x_0$ gives $$x_0 = p \quad (37)$$

the focal point of the parabola.

Referring once again to the direction vector (u, v) for a LADAR beam emitted by the LADAR at an angle θ and having a length equal to one, the values u and v can be defined as follows $$u = \cos\theta$$

$$v = \sin\theta \quad (38)$$

and substituting equation (38) into equation (10) gives $$t_1 = \frac{2p\cos\theta \pm \sqrt{(2p\cos\theta)^2 - 4(p\sin\theta)(y_0\cos\theta - x_0\sin\theta)}}{2p\sin\theta} \quad (39)$$

Expanding equation (39) and substituting relevant trigonometric identities gives $$t_1 = \frac{2p\cos\theta \pm \sqrt{2p^2(\cos 2\theta + 1) - 2py_0\sin\vartheta + 2px_0(1 - \cos 2\theta)}}{2p\sin\theta} \quad (40)$$

From equation (3), the y-coordinate that the LADAR beam hits the mirror is given by $$y = 2p\frac{2p\cos\theta \pm \sqrt{2p^2(\cos 2\theta + 1) - 2py_0\sin\vartheta + 2px_0(1 - \cos 2\theta)}}{2p\sin\theta} \quad (41)$$

or $$y = \frac{2p\cos\theta \pm \sqrt{2p^2(\cos 2\theta + 1) - 2py_0\sin\vartheta + 2px_0(1 - \cos 2\theta)}}{\sin\theta} \quad (42)$$

The focus position of the parabola is (p,0) and so setting $y_0 = 0$ gives $$y = \frac{2p\cos\theta \pm \sqrt{2p\cos 2\theta(p - x_0) + 2p(p + x_0)}}{\sin\theta} \quad (43)$$

When $x_0 = p$ then $$y = \frac{2p\cos\theta \pm \sqrt{2p(2p)}}{\sin\theta} \quad (44)$$

or $$y = 2p\frac{\cos\theta \pm 1}{\sin\theta} \quad (45)$$

and $$x = y \tan\theta \quad (46)$$

The derivative of the intercept height with respect to angle is given by $$\frac{dy}{d\theta} = 2p\frac{d}{d\theta}\left(\frac{\cos\theta \pm 1}{\sin\theta}\right) \quad (47)$$

and $$\frac{dy}{d\theta} = 2p\frac{d}{d\theta}\left(\frac{\pm\cos\theta - 1}{\sin^2\theta}\right) \quad (48)$$

Equation (48) means that for equally spaced θ the height will not be equally spaced as the gradient is not independent of θ.

Figure 3:
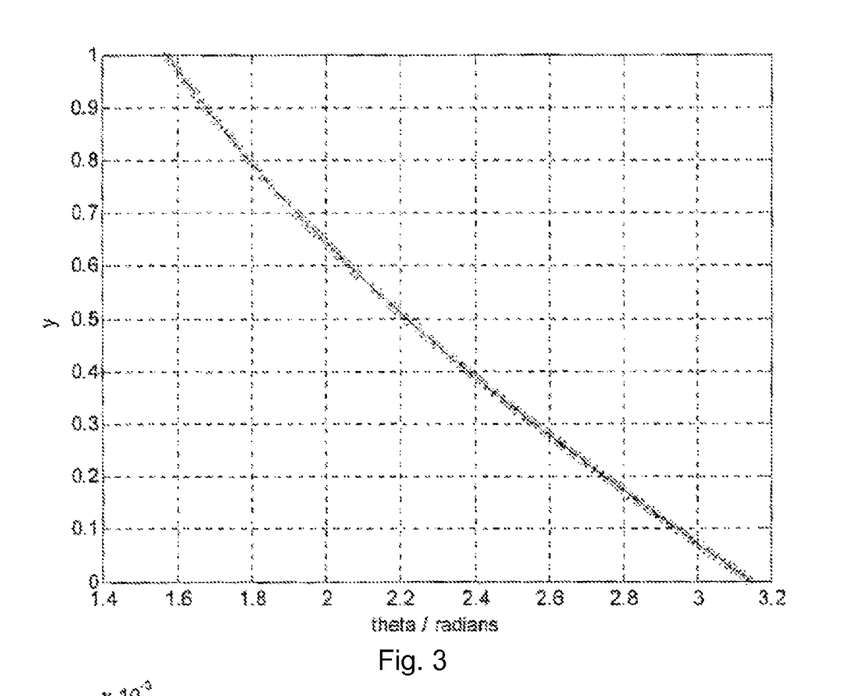
FIG. 3 shows a graph of intercept height and LADAR beam angle for an example mirror.

Referring to FIG. 3, a graph is shown which gives the intercept height (y) for a given LADAR beam angle for an example which has 4000 points equally spaced around 360° (so between $$\frac{\pi}{2} < \theta < \pi$$

there are 1000) where p=0.5.

Figure 4:
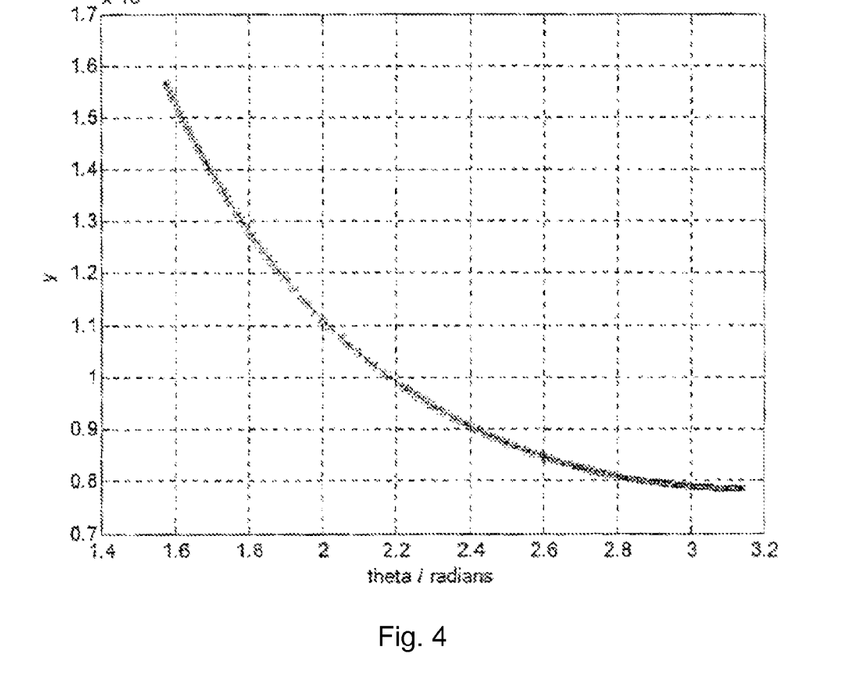
FIG. 4 shows a graph of the difference in intercept height between LADAR beam angles and LADAR beam angle for an example mirror.

Moreover, FIG. 4 shows the difference between the heights given in FIG. 3 for the same angles. As the graph is significantly curved, it is clear that the difference in heights is not uniform as the angle of the LADAR beam changes.

As a result of the above calculations, the intercept height y can be determined for a LADAR beam if p, the distance from the vertex to the focus of the parabola, is known, the angle of the LADAR beam is known and centre of reference $(x_0, y_0)$ is at the focal point of the parabolic mirror.

Figure 5:
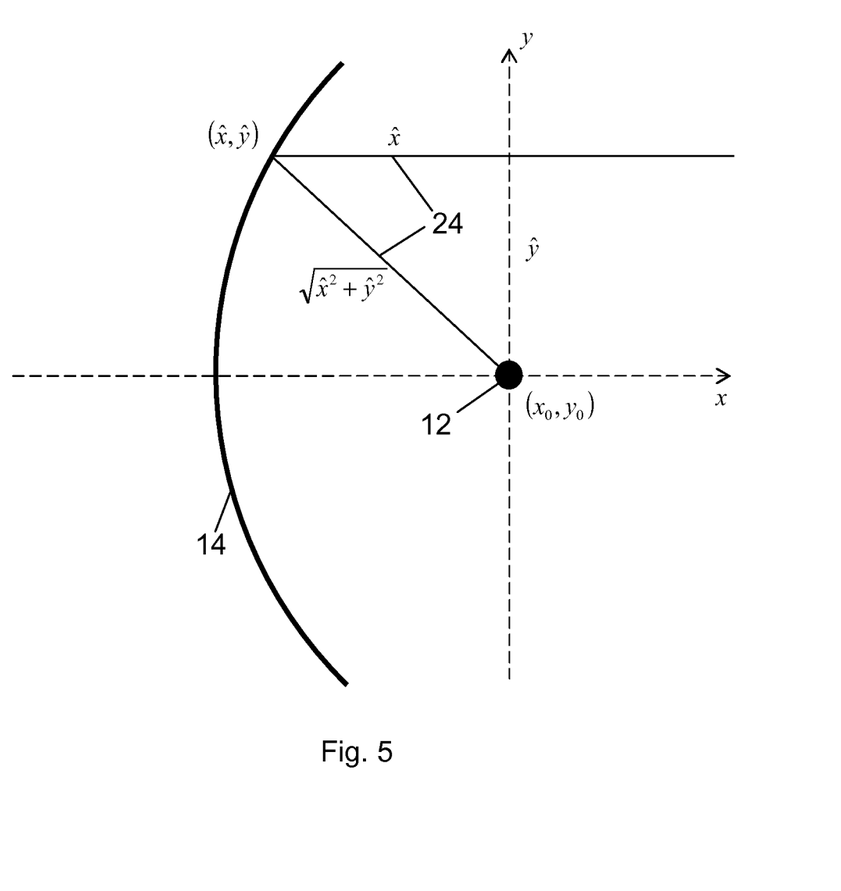
FIG. 5 shows a more detailed view of a laser beam path reflecting from the parabolic mirror of FIG. 1.

As the x and y coordinate of the intercept point on the parabolic mirror can be calculated, it is possible to correct any distance calculation to take into account the mirror 14. Referring to FIG. 5, the laser transmission and reception means 12 and the parabolic mirror 14 of FIG. 1 are shown with reference to an x-y coordinate system having its reference point $(x_0, y_0)$ at the focal point of the parabolic mirror 14. A beam 24 is emitted from a laser unit in the laser transmission and reception means 12 and is reflected from the parabolic mirror at an intercept point $(\hat{x}, \hat{y})$ before being reflected back along the same path from an object (not shown). The time-delay analysis means 20 calculates the time-delay between the emission of the laser beam 24 and the receipt of reflected light at the light reception means. The position analysis means 22 can then calculate a distance $d_r$ between the laser unit and the object along the laser beam path 24. Once the distance $d_r$ has been calculated to the object based on the time delay of the reflected light, the additional distance traveled by the LADAR beam due to reflection from the parabolic mirror can be deducted. As we have the location of the intercept $(\hat{x}, \hat{y})$ the distance from the reference point $d_{ref}$ can be calculated as follows $$d_{ref} = d_r - \hat{x} - \sqrt{\hat{x}^2 + \hat{y}^2} \quad (49)$$

As such, the system can provide a Cartesian coordinate position for an object reflecting light from a LADAR beam emission using a parabolic mirror.

Referring once again to FIG. 1, objects B and C are not detected by any of LADAR beam paths $P_1$ to $P_{15}$ due to the diverging nature of the beam paths. If the direction of beam path $P_8$ is, for example, the direction of travel of an autonomous vehicle, detecting objects B and C are important. Prior art systems increase the resolution by increasing the subdivisions of angles at which laser beams are emitted. This is often enabled by increasing the number of lasers used in the system.

If a particular direction is of most interest, such as is the case with autonomous vehicles, then using a mirror can increase the resolution in that direction. As shown in FIG. 1, the mirror 14 enables the laser beam paths in a direction which is of less interest, such as behind a vehicle, to be used to increase the resolution in another direction, which in this case is in the direction of beam path $P_8$. Object B is detected by beam paths $C_6$ and $C_7$ and Object C is detected by beam paths $C_2$ and $C_3$. Furthermore, in the special case of a parabolic mirror, the resolution does not decrease with distance from the LADAR unit 10.

Although the system above is described in relation to a parabolic mirror, other concave mirrors can also improve the resolution of the system, although without the added benefit of direct calculation into the Cartesian coordinate system. In addition, it can be envisaged that the reflected light rays may even converge from a mirror to give increased resolution at a particular point.

Furthermore, although the mirror described herein is referred to as a single mirror, multiple or arrays of mirrors may be used to provide the same effect. In addition, it is possible within the scope of the invention to add other optic elements, such as refractive lenses, to alter the path of light rays. Light rays could be refracted before they are reflected from the reflection means or, if they are not intended to be reflected from the reflection means, to converge the light rays more than they would have been.

The main application envisaged for a LIDAR of this type is in autonomous vehicles in systems such as collision avoidance systems or terrain selection systems. For either application, the LIDAR could be mounted at wheel height, around the position than headlights would normally be placed, in order to detect such objects as ruts in the road. In this manner an autonomous vehicle can select not only objects to avoid but the most promising terrain to progress over. Given that the information that the LIDAR can provide can be used in these systems for autonomous vehicles, it can also be envisaged that it can be used in driver assistance systems in vehicles for training or warning drivers to objects or terrain choices.

Further modifications and improvements may be made without departing from the scope of the present invention.

The invention claimed is:

1. A Light Detection and Ranging (LIDAR) apparatus comprising:
    a light source means for emitting a light ray at plural angular intervals, and arranged such that the light ray is rotatable about a rotational centre to sense features through 360° about the rotational centre;
    a parabolic object mirror having a focal point, the object mirror being positioned such that the rotational centre of the light ray is substantially located at the focal point and the object mirror falls within an angular range of less than 180°, and successive emitted light rays once reflected from the object mirror follow a substantially parallel path;
    reception means for receiving reflected light from one or more features in a path of the light ray; and
    analysis means for calculating a position at which one or more features are present based on an angle at which the light ray was emitted and a time delay associated with received reflected light,
    wherein, when the light ray is reflected by the object mirror, the analysis means takes into account the object mirror reflection, and a position of the one or more features is calculated using a Cartesian coordinate system having a reference point at the focal point, and
    wherein, when the light ray is emitted at an angle such that the light ray is not reflected by the object mirror, the analysis means calculates a polar coordinate position for any feature which reflects light from the light ray.

2. A LIDAR as claimed in claim 1, wherein the object mirror is a single mirror.

3. A LIDAR as claimed in claim 1, wherein the object mirror is an array of mirrors.

4. A LIDAR as claimed in claim 1, wherein characteristics and the position of the object mirror are such that successive emitted light rays once reflected from the object mirror follow a non-diverging path.

5. A LIDAR as claimed in claim 1, wherein the analysis means calculates an intercept point as a point at which the light ray is reflected from the object mirror.

6. A LIDAR as claimed in claim 1, wherein the light source means is rotatable between a first and second position in an arc.

7. A LIDAR as claimed in claim 1, wherein the light source means is fixed with respect to the object mirror, and the light ray is rotated between a first and second position in an arc through reflection from the object mirror.

8. A LIDAR as claimed in claim 1, wherein the light source means and object mirror are co-located at the focal point.

9. A LIDAR as claimed claim 1, wherein the light source means is located at the focal point and the object mirror is spaced apart from the focal point.

10. A LIDAR as claimed in claim 1, wherein the light source is at least one laser and the light ray is a laser beam.

11. A LIDAR as claimed in claim 1, wherein the light source is a single laser and the light ray is a laser beam.

12. A LIDAR as claimed in claim 1, comprising:
    a refractive means for refracting light rays to reduce divergence from the light source means.

13. A LIDAR as claimed in claim 1, comprising:
    directional movement means arranged to pan or tilt the apparatus, and for allowing light rays reflected from the object mirror to be aimed in a particular direction.

14. A method of operating a LIDAR having a light source means comprising:
    (i) emitting a light ray from the light source means at regular intervals;
    (ii) rotating the light ray to sense features through 360° about a rotational centre at a plurality of angular intervals;
    (iii) reflecting the light ray from a parabolic object mirror having a focal point, the object mirror being positioned such that the rotational centre of the light ray is substantially located at the focal point and the object mirror falls within an angular range of less than 180°, wherein the light rays reflected from the object mirror are substantially parallel;
    (iv) receiving reflected light from one or more features in the path of the light ray; and
    (v) calculating a position at which one or more features are present based on an angle that the light ray was emitted and a time delay associated with received reflected light,
    wherein, when the light ray is reflected by the object mirror, the analysis means takes into account the reflection of the light ray from the object mirror, and a position of the one or more features is calculated using a Cartesian coordinate system having a reference point at the focal point, and
    wherein, when the light ray is emitted at an angle such that the light ray is not reflected by the object mirror, a polar coordinate position is calculated for any feature which reflects light from the light ray.

15. A method as claimed in claim 14, wherein the object mirror is a single mirror.

16. A method as claimed in claim 14, wherein the object mirror is an array of mirrors.

17. A method as claimed in claim 14, comprising:
    calculating an intercept point as a point at which the light ray is reflected from the object mirror.

18. A method as claimed in claim 14, comprising:
    rotating the light source means between a first and second position in an arc.

19. A method as claimed in claim 14, wherein the light source means is fixed with respect to the object mirror, the method comprising:
rotating the light ray between a first and second position in an arc through reflection from the object mirror.

20. A method as claimed in claim 14, wherein the light source means and object mirror are co-located at the focal point.

21. A method as claimed in claim 14, wherein the light source means is located at the focal point and the object mirror is spaced apart from the focal point.

22. A method as claimed in claim 14, wherein the light source is at least one laser and the light ray is a laser beam.

23. A method as claimed in claim 14, wherein the light source is a single laser and the light ray is a laser beam.

24. A vehicle collision avoidance system comprising:
a Light Detection and Ranging (LIDAR) apparatus, wherein the LIDAR apparatus comprises:
a light source means for emitting a light ray at plural angular intervals, and arranged such that the light ray is rotatable about a rotational centre to sense features through 360°;
a parabolic object mirror having a focal point, the object mirror being positioned such that the rotational centre of the light ray is substantially located at the focal point and the object mirror falls within an angular range of less than 180°, and successive emitted light rays once reflected from the object mirror follow a substantially parallel path;
reception means for receiving reflected light from one or more features in a path of the light ray; and
analysis means for calculating a position at which one or more features are present based on an angle at which the light ray was emitted and a time delay associated with received reflected light,
wherein, when the light ray is reflected by the object mirror, the analysis means takes into account the object mirror reflection, and a position of the one or more features is calculated using a Cartesian coordinate system having a reference point at the focal point, and
wherein, when the light ray is emitted at an angle such that the light ray is not reflected by the object mirror, the analysis means calculates a polar coordinate position for any feature which reflects light from the light ray.

25. A preferred terrain selection system comprising:
a Light Detection and Ranging (LIDAR) apparatus, wherein the LIDAR apparatus comprises:
a light source means for emitting a light ray at plural angular intervals, and arranged such that the light ray is rotatable about a rotational centre to sense features through 360°;
a parabolic object mirror having a focal point, the object mirror being positioned such that the rotational centre of the light ray is substantially located at the focal point and the object mirror falls within an angular range of less than 180°, and successive emitted light rays once reflected from the object mirror follow a substantially parallel path;
reception means for receiving reflected light from one or more features in a path of the light ray; and
analysis means for calculating a position at which one or more features are present based on an angle at which the light ray was emitted and a time delay associated with received reflected light,
wherein, when the light ray is reflected by the object mirror, the analysis means takes into account the object mirror reflection, and a position of the one or more features is calculated using a Cartesian coordinate system having a reference point at the focal point, and
wherein, when the light ray is emitted at an angle such that the light ray is not reflected by the object mirror, the analysis means calculates a polar coordinate position for any feature which reflects light from the light ray.

26. A vehicle collision avoidance system according to claim 24, wherein the vehicle collision avoidance system is comprised in an autonomous vehicle.

27. A vehicle collision avoidance system according to claim 24, wherein the vehicle collision avoidance system is comprised in a driver assistance system for a vehicle.

* * * * *